United States Patent
Song et al.

(10) Patent No.: US 12,543,088 B2
(45) Date of Patent: Feb. 3, 2026

(54) APPARATUS AND METHOD FOR PROVIDING SEAMLESS NETWORK SERVICE BASED ON HETEROGENEOUS MULTIPLE NETWORKS

(71) Applicant: ELECTRONICS AND TELECOMMUNICATIONS RESEARCH INSTITUTE, Daejeon (KR)

(72) Inventors: Yoo-Seung Song, Daejeon (KR); Kyoung-Wook Min, Daejeon (KR); Jeong-Dan Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 414 days.

(21) Appl. No.: 18/158,175

(22) Filed: Jan. 23, 2023

(65) Prior Publication Data

US 2023/0413144 A1 Dec. 21, 2023

(30) Foreign Application Priority Data

Jun. 21, 2022 (KR) .................. 10-2022-0075447

(51) Int. Cl.
*H04W 36/18* (2009.01)
*H04W 36/30* (2009.01)
*H04W 48/18* (2009.01)

(52) U.S. Cl.
CPC ......... *H04W 36/18* (2013.01); *H04W 36/305* (2018.08); *H04W 48/18* (2013.01)

(58) Field of Classification Search
None
See application file for complete search history.

(56) References Cited

U.S. PATENT DOCUMENTS 6,108,300 A * 8/2000 Coile .................. H01R 31/005
714/4.12
6,839,865 B2 * 1/2005 Gould .................... H04L 69/22
370/356

(Continued)

FOREIGN PATENT DOCUMENTS

KR 10-2008-0111838 A 12/2008
KR 10-2013-0008468 A 1/2013

(Continued)

OTHER PUBLICATIONS

Hyeon-jin Jeong et al., "Transmission Rate Control in Heterogeneous Wireless Networks Using Multiple Connections", The Journal of Korean Institute of Communications and Information Sciences, vol. 37B, No. 11, pp. 993-1003, Nov. 2012; with English abstract.

*Primary Examiner* — Wutchung Chu
*Assistant Examiner* — Berhanu D Belete
(74) *Attorney, Agent, or Firm* — Rabin & Berdo, P.C.

(57) ABSTRACT

Disclosed herein are an apparatus and method for providing a seamless network service based on multiple heterogeneous networks. The method for providing a seamless network service based on multiple heterogeneous networks includes providing, by a multi-network management apparatus, a service transmitted from a server to a terminal over a primary network, synchronizing, by the multi-network management apparatus, service data transmitted over the primary network with a secondary network maintained in a standby state, changing, by the multi-network management apparatus, the secondary network to the primary network as a communication failure between the primary network and the terminal occurs, and providing, by the multi-network management apparatus, the service transmitted from the server to the terminal over the changed primary network.

18 Claims, 7 Drawing Sheets

(56) References Cited

U.S. PATENT DOCUMENTS

| | | | | |
|---|---|---|---|---|
| 7,039,827 B2* | 5/2006 | Meyer | ................ | G06F 11/0766 |
| | | | | 714/4.11 |
| 8,145,945 B2* | 3/2012 | Lee | .................... | G06F 11/2097 |
| | | | | 714/15 |
| 8,335,943 B2* | 12/2012 | Kamath | .............. | G06F 11/2097 |
| | | | | 714/4.11 |
| 8,938,638 B2* | 1/2015 | Taranov | .............. | G06F 11/2038 |
| | | | | 714/4.11 |
| 9,298,728 B2* | 3/2016 | McAlister | ............. | G06F 16/275 |
| 9,426,021 B2* | 8/2016 | Mendiratta | ......... | G06F 11/2002 |
| 9,483,369 B2* | 11/2016 | Sporel | ................. | G06F 11/2028 |
| 10,187,501 B1* | 1/2019 | Butler | .................... | H04M 1/18 |
| 10,210,005 B2* | 2/2019 | Cape | ................... | G06F 9/45516 |
| 2009/0201799 A1* | 8/2009 | Lundstrom | ............ | H04L 41/06 |
| | | | | 370/217 |
| 2010/0064168 A1* | 3/2010 | Smoot | ................ | G06F 11/2069 |
| | | | | 714/6.12 |
| 2012/0113956 A1 | 5/2012 | Kim et al. | | |
| 2012/0311376 A1* | 12/2012 | Taranov | .............. | G06F 11/2097 |
| | | | | 714/4.11 |
| 2013/0250755 A1* | 9/2013 | Clark | ..................... | H04L 45/22 |
| | | | | 370/228 |
| 2014/0056122 A1* | 2/2014 | Singal | .................... | H04L 45/28 |
| | | | | 370/220 |
| 2015/0263836 A1 | 9/2015 | Kim | | |
| 2016/0345192 A1* | 11/2016 | Garg | .................... | H04L 12/2854 |
| 2017/0257260 A1* | 9/2017 | Govindan | ........... | H04L 12/4633 |
| 2018/0278469 A1* | 9/2018 | Gandhi | .............. | H04L 12/2898 |

FOREIGN PATENT DOCUMENTS

| | | |
|---|---|---|
| KR | 20190048324 A | 5/2019 |
| KR | 20220064605 A | 5/2022 |

* cited by examiner

APPARATUS AND METHOD FOR PROVIDING SEAMLESS NETWORK SERVICE BASED ON HETEROGENEOUS MULTIPLE NETWORKS

CROSS REFERENCE TO RELATED APPLICATION

This application claims the benefit of Korean Patent Application No. 10-2022-0075447, filed Jun. 21, 2022, which is hereby incorporated by reference in its entirety into this application.

BACKGROUND OF THE INVENTION

1. Technical Field

The following embodiments relate to technology for providing a network service using a wired/wireless network.

2. Description of the Related Art

Recently, various vehicle network services using vehicle communication technology have gradually been expanded. However, those services enable a road traffic system to be more safely and conveniently maintained by providing various convenience services to drivers and transmitting/receiving pieces of necessary data through communication with vehicles.

To date, by such typical network connection and services, a data service has been provided to a subscriber over a single network. Further, when the subscriber falls out of the coverage of a specific access network due to the movement of the subscriber, a handover method has been chiefly used to continuously provide a network service.

However, a wired/wireless network policy may incur many problems such as in the case where provision of a network service to a subscriber cannot be promptly resumed in the event of an unexpected failure or accident because the aspect of service efficiency is excessively emphasized.

Meanwhile, when multiple networks are utilized, research into only technology for increasing a data transfer rate for service subscribers or for partitioning data and distributing and transmitting partitioned data to the multiple networks has been conducted.

SUMMARY OF THE INVENTION

An embodiment is intended to provide a seamless and fast network service in real time when a network failure occurs.

An embodiment is intended to provide a seamless network service using multiple networks when a network failure occurs.

An embodiment is intended to provide a customized network service corresponding to the real-time quality of a network.

In accordance with an aspect, there is provided a method for providing a seamless network service based on multiple heterogeneous networks, the method including providing, by a multi-network management apparatus, a service transmitted from a server to a terminal over a primary network, synchronizing, by the multi-network management apparatus, service data transmitted over the primary network with a secondary network maintained in a standby state, changing, by the multi-network management apparatus, the secondary network to the primary network as a communication failure between the primary network and the terminal occurs, and providing, by the multi-network management apparatus, the service transmitted from the server to the terminal over the changed primary network.

The method may further include, before providing the service transmitted from the server to the terminal over the primary network, selecting and registering, by the multi-network management apparatus, the primary network and at least one secondary network from among two or more heterogeneous networks accessible to the terminal that has requested registration of the service.

Selecting and registering may include notifying each of corresponding networks that the corresponding networks are selected as the primary network and the secondary network, and providing information about the primary network to the server and notifying the server that provision of the service is available.

Selecting and registering may include selecting the primary network and the secondary network based on at least one of criteria including a service coverage of each of the networks and service provision conformity for the service requested by the terminal, or a combination thereof.

Each of providing the service transmitted from the server to the terminal over the primary network and providing the service transmitted from the server to the terminal over the changed primary network may include recognizing a real-time state of the primary network and providing information about the real-time state to the server, and transmitting a customized service, corresponding to the real-time state information of the primary network provided from the server, over the primary network.

The method may further include periodically checking, by the secondary network and the terminal, a connection to the secondary network.

Changing the secondary network to the primary network may include, as the multi-network management apparatus receives a notification of occurrence of a network failure from the primary network, notifying the secondary network that the secondary network has changed to the primary network, and transmitting, by the secondary network having received the notification of the change to the primary network, a notification of the change to the primary network to the terminal while transmitting network service synchronization data of a previous primary network to the terminal.

Changing the secondary network to the primary network may include requesting, by the terminal having recognized occurrence of a network failure in the primary network, a change to the primary network from the secondary network, and transmitting, by the secondary network, a notification of the change of the secondary network to the primary network to the multi-network management apparatus, wherein the secondary network having received the notification of the change to the primary network transmits network service synchronization data of a previous primary network to the terminal.

The method may further include reselecting and registering, by the multi-network management apparatus, a new secondary network from among two or more heterogeneous networks accessible to the terminal that has requested registration of the service.

In accordance with another aspect, there is provided a multi-network management apparatus, including memory configured to store at least one program, and a processor configured to execute the program, wherein the program is configured to perform providing a service transmitted from a server to a terminal over a primary network, synchronizing service data transmitted over the primary network with a secondary network maintained in a standby state, changing the secondary network to the primary network as a communication failure between the primary network and the terminal occurs, and providing the service transmitted from the server to the terminal over the changed primary network.

The program may be configured to further perform, before providing the service transmitted from the server to the terminal over the primary network, selecting and registering the primary network and at least one secondary network from among two or more heterogeneous networks accessible to the terminal that has requested registration of the service.

The program may be configured to further perform, in selecting and registering, notifying each of corresponding networks that the corresponding networks are selected as the primary network and the secondary network, and providing information about the primary network to the server and notifying the server that provision of the service is available.

The program may be configured to further perform, in selecting and registering, selecting the primary network and the secondary network based on at least one of criteria including a service coverage of each of the networks and service provision conformity for the service requested by the terminal, or a combination thereof.

The program may be configured to further perform, in providing the service transmitted from the server to the terminal over the primary network, recognizing a real-time quality state of the primary network and providing information about the real-time quality state to the server, and transmitting a customized service, corresponding to the real-time quality state information of the primary network provided from the server, over the primary network.

The program may be configured to further perform, in providing the service transmitted from the server to the terminal over the changed primary network, as a notification of occurrence of a network failure is received from the primary network, notifying the secondary network that the secondary network has changed to the primary network, and in recognizing the real-time quality state of the primary network and transmitting information about the real-time quality state to the server, recognizing a real-time quality state of the changed primary network and providing information about the real-time quality state to the server, and transmitting a customized service, corresponding to the real-time quality state information of the changed primary network provided from the server, over the changed primary network.

The program may be configured to further perform, in changing the secondary network to the primary network, as a notification of a change of the secondary network to the primary network is received from the secondary network, recognizing a real-time quality state of the changed primary network and providing information about the real-time quality state to the sever, and transmitting a customized service, corresponding to the real-time quality state of the changed primary network provided from the server, over the changed primary network.

The program may be configured to further perform reselecting and registering a new secondary network from among two or more heterogeneous networks accessible to the terminal that has requested registration of the service.

In accordance with a further aspect, there is provided a terminal, including memory configured to store at least one program, and a processor configured to execute the program, wherein the program is configured to perform accessing two or more heterogeneous networks and requesting registration of a service, receiving a notification from each of a primary network and a secondary network selected from among the two or more heterogeneous networks, and transmitting/receiving service data to/from a server over the primary network, wherein the program is configured to further perform periodically accessing the secondary network while transmitting/receiving the service data.

The program may be configured to further perform, as a notification of a change to the primary network is received from the secondary network, transmitting/receiving the service data to/from the server over the changed primary network.

The program may be configured to further perform, as occurrence of a failure in the primary network is recognized, requesting a change to the primary network from the secondary network, and transmitting/receiving the service data to/from the server over the changed primary network.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Hereinafter, an apparatus and method for providing a seamless network service based on multiple heterogeneous networks will be described in detail with reference to FIGS. 1 to 7.

Figure 1:
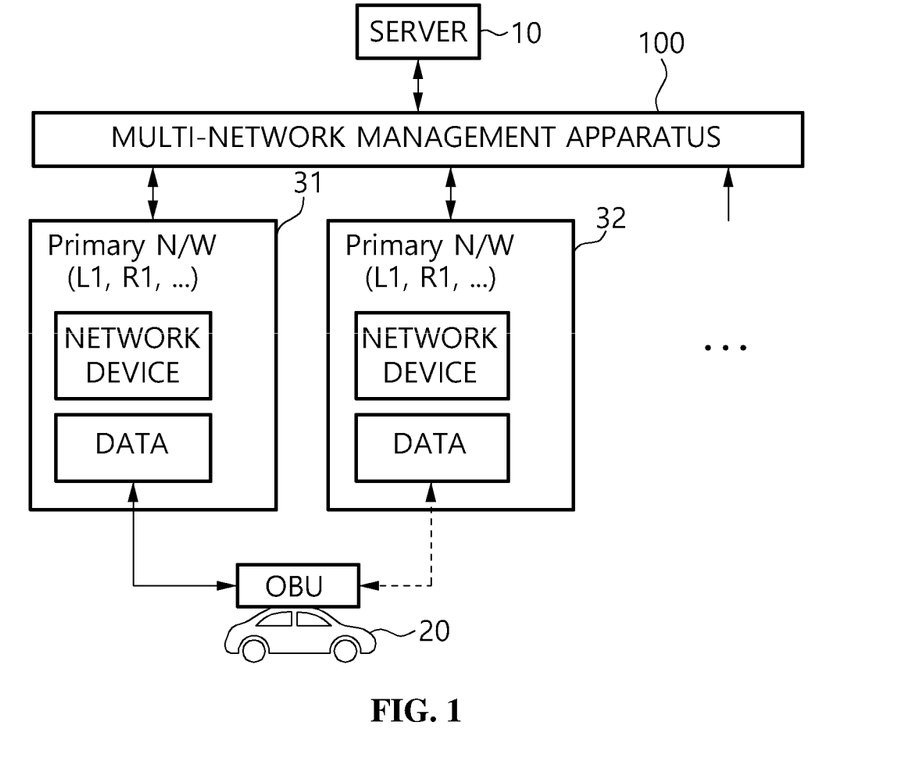
FIG. 1 is a schematic block configuration diagram of a system for providing a seamless network service based on multiple heterogeneous networks according to an embodiment.
Figure 2:
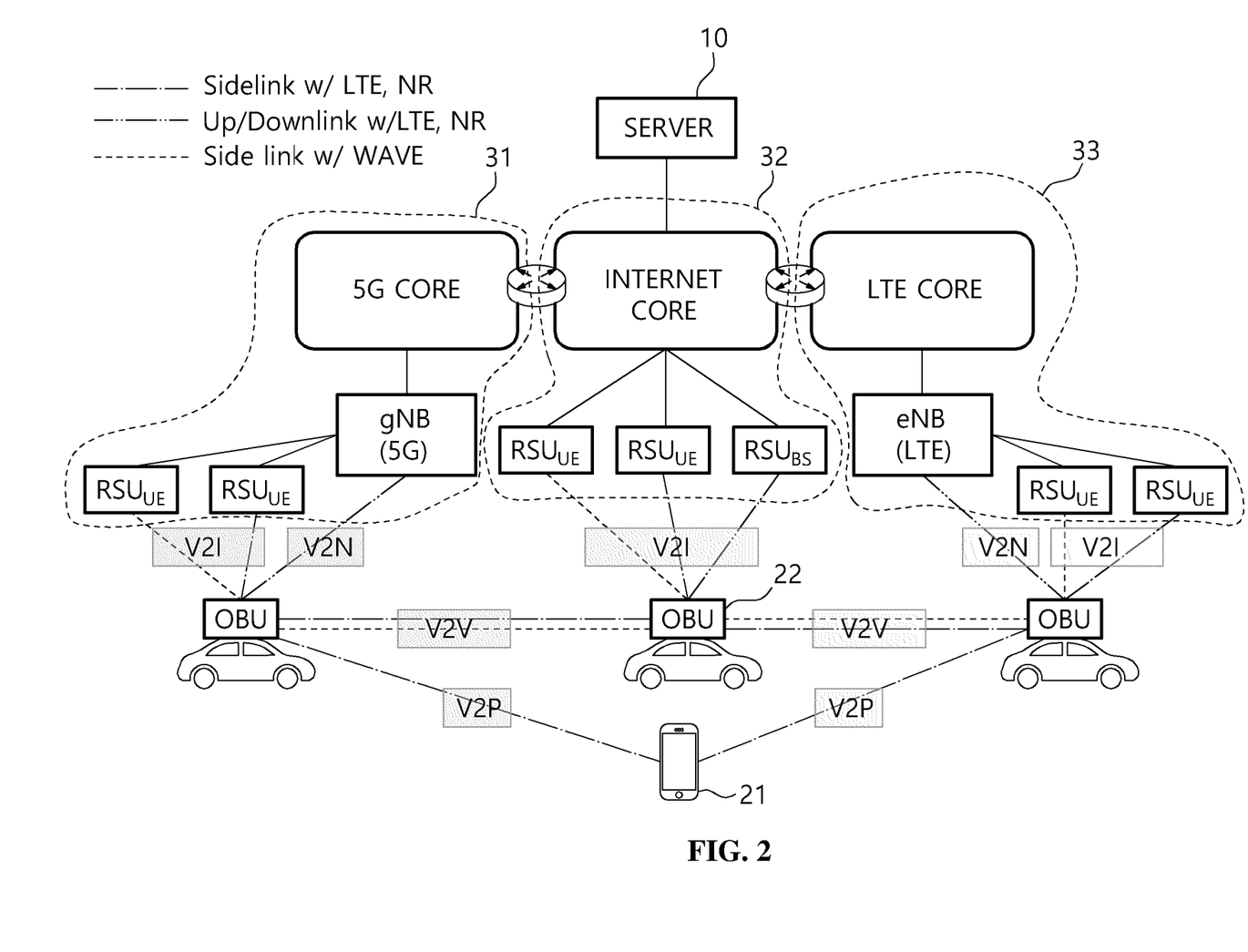
FIG. 2 is a diagram illustrating an example of a system for providing a typical vehicle network service.

FIG. 1 is a schematic block configuration diagram of a system for providing a seamless network service based on multiple heterogeneous networks according to an embodiment, and FIG. 2 is a diagram illustrating an example of a system for providing a typical vehicle network service. Here, although an example of a vehicle network is described, the present disclosure is not limited to the vehicle network. That is, the embodiment may be equally applied to all types of network services through the communication terminal of a normal user.

Referring to FIG. 1, the system for providing a seamless network service based on multiple heterogeneous networks according to the embodiment may include a server 10, a terminal 20, a multi-network management apparatus 100, and multiple heterogeneous networks 31, 32, . . . .

The server 10 provides various network services to the terminal 20 over a wired/wireless communication network. For example, the network service may be one provided to a subscriber through a communication terminal (e.g., an on-board unit: OBU) mounted on a vehicle.

The terminal 20 may be a user device which is subscribed to the network service provided by the server 10. For example, as illustrated in FIG. 2, when a service subscriber is a vehicle, the terminal 20 may include a vehicle communication device (OBU) 22 or a mobile terminal 21 enabling wireless communication with the vehicle communication device (OBU) 22.

The multiple heterogeneous networks 31, 32, . . . may be wired/wireless communication networks which transfer a network service provided from the server 10 to the terminal 20, and may include various heterogeneous networks. For example, as illustrated in FIG. 2, the multiple heterogeneous networks 31, 32, . . . may include various types of networks such as a fifth-generation (5G) network 31, the Internet 32, and a Long-Term Evolution (LTE) network 33.

However, an access network in the system for providing a typical vehicle network service, such as that illustrated in FIG. 2, may be directly coupled to the server 10 over a core network (e.g., 5G core, LTE core or the Internet core), and various data links V2I, V2N, V2V, and V2P are present through the communication device (OBU) 22 mounted on the vehicle and infrastructure access networks RSU, gNB, and eNB.

On the other hand, in the system for providing a seamless network service based on multiple heterogeneous networks according to the embodiment, such as that illustrated in FIG. 1, the multi-network management apparatus 100 is connected between the server 10 and the multiple heterogeneous networks 31, 32, . . . .

That is, the multi-network management apparatus 100 according to the embodiment may recognize the real-time states of the multiple heterogeneous networks 31, 32, . . . , and then arbitrate connections between the server 10 and the multiple heterogeneous networks 31, 32, . . . in order to provide a seamless fast network service in real time when a network failure occurs.

The multi-network management apparatus 100 may select a primary network 31 and a secondary network 32 from among the multiple heterogeneous networks 31, 32, . . . .

Thereafter, the multi-network management apparatus 100 may manage the networks so that transmission data between the primary network 31 and the secondary network 32 is synchronized with each other. That is, data transferred to the primary network 31 may be equally transferred to the secondary network 32, and may be stored and managed in a buffer in an access network stage. The reason for this is to allow data actualized and managed in the buffer of the secondary network 32 to be immediately transmitted to the terminal 20 in a wireless manner when a failure (fault) occurs in the primary network 31.

Furthermore, each of the multiple heterogeneous networks 31, 32, . . . has a unique latency L and a data transfer rate R, which may continuously vary over time. In this case, the multi-network management apparatus 100 may recognize, in real time, state information including the latency L and the data transfer rate R of each of the multiple heterogeneous networks 31, 32, . . . , and may transfer the state information to the server 10. Then, the server 10 may determine a service quality requirement by the corresponding subscriber based on the network state information provided in real time, and may provide a service conforming to the subscriber's service quality requirement.

A description of detailed operations between respective components of the above-described system for providing a seamless network service based on multiple heterogeneous networks will be made below with reference to FIGS. 3 to 6.

Figure 3:
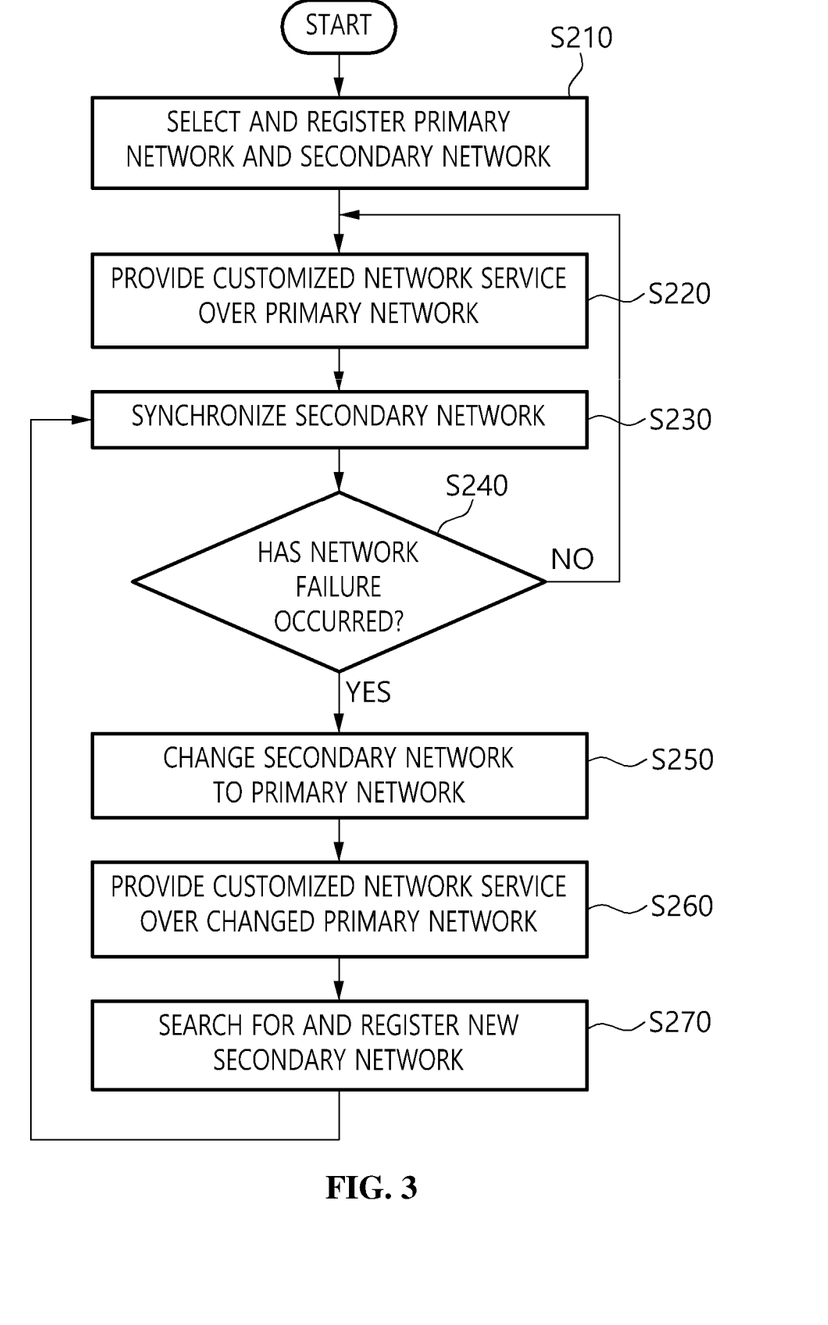
FIG. 3 is a flowchart for explaining a method for providing a seamless network service based on multiple heterogeneous networks according to an embodiment.

FIG. 3 is a flowchart for explaining a method for providing a seamless network service based on multiple heterogeneous networks according to an embodiment.

Referring to FIG. 3, the method for providing a seamless network service based on multiple heterogeneous networks according to the embodiment may include step S220 of providing a service transmitted from a server to a terminal over a primary network, step S230 of synchronizing service data transmitted over the primary network with a secondary network maintained in a standby state, step S250 of, when a communication failure between the primary network and the terminal occurs at step S240, changing the secondary network to the primary network, and step S260 of providing the service transmitted from the server to the terminal over the changed primary network.

The method for providing a seamless network service based on multiple heterogeneous networks according to the embodiment may further include, before step S220 of providing the service to the terminal over the primary network, step S210 of selecting the primary network and the secondary network from among two or more heterogeneous networks accessible to the terminal that has requested registration of the service, and registering the selected networks.

Here, step S210 of selecting and registering the primary network and the secondary network may include the step of notifying each of the corresponding networks that the corresponding networks are selected as the primary network and the secondary network and the step of providing information about the primary network to the server and notifying the server that provision of the service is available.

Here, at step S210 of selecting and registering the primary network and the secondary network, the primary network and the secondary network may be selected based on at least one of criteria including the service coverage of each of the networks and service provision conformity for the service requested by the terminal, or a combination thereof.

Here, S220 of providing the service to the terminal over the primary network may include the step of recognizing the real-time state of the primary network and providing information about the real-time state to the server and the step of transmitting a customized service, corresponding to the real-time state information of the primary network provided from the server, over the primary network.

Here, the method may further include the step of allowing the secondary network and the terminal to periodically check a connection to the secondary network.

Steps S210 to S230 will be described in detail later with reference to FIG. 4.

Meanwhile, for step S250 of, when a communication failure between the primary network and the terminal occurs at step S240, changing the secondary network to the primary network, and step S260 of providing the service transmitted from the server to the terminal over the changed primary network according to an embodiment, two embodiments may be implemented depending on the entity that recognizes and reports the occurrence of a network failure.

A first embodiment is the case where the infrastructure of the primary network recognizes notification of occurrence of a network failure (fault). That is, as the multi-network management apparatus receives the notification of occurrence of a network failure from the primary network, it notifies the secondary network that the secondary network has changed to the primary network, and the second network having received the notification of the change to the primary network may transmit data for synchronization with the network service (i.e., network service synchronization data) of the previous primary network while transmitting the notification of the change to the primary network to the terminal. A description of the first embodiment of steps S250 and S260 will be made in detail later with reference to FIG. 5.

A second embodiment is the case where the terminal recognizes notification of occurrence of a network failure. That is, the embodiment may further include the step of allowing the terminal that recognizes the occurrence of a network failure in the primary network to request a change to the primary network from the secondary network, and the step of allowing the secondary network to transmit notification of the change of the secondary network to the primary network to the multi-network management apparatus, wherein the secondary network having received the notification of the change to the primary network may transmit the network service synchronization data of the previous primary network to the terminal. A description of the second embodiment of steps S250 and S260 will be made in detail later with reference to FIG. 6.

Meanwhile, the method for providing a seamless network service based on multiple heterogeneous networks according to the embodiment may further include step S270 of reselecting and registering a new secondary network from among two or more heterogeneous networks accessible to the terminal 20 that has requested registration of the service.

Figure 4:
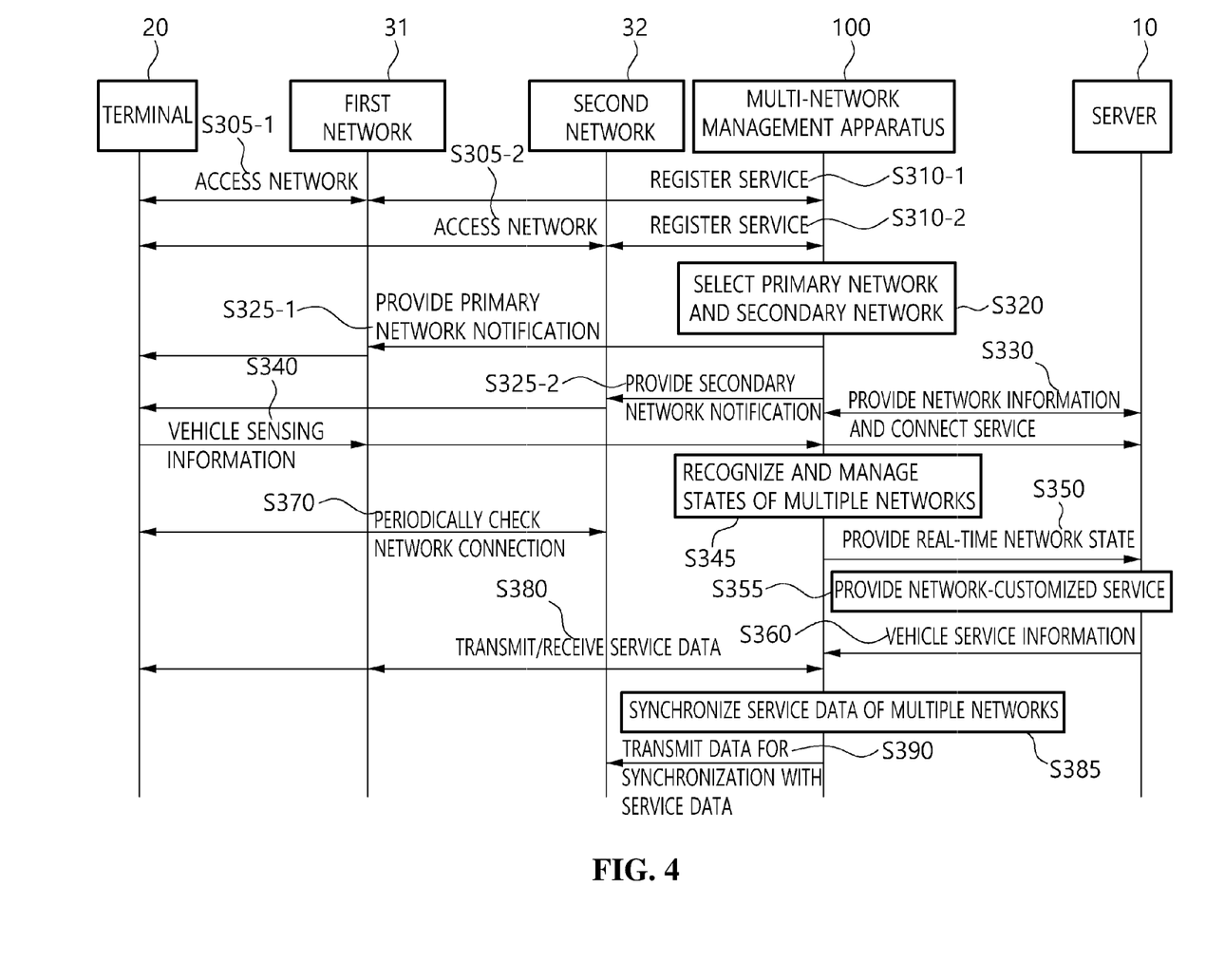
FIG. 4 is a signal flow diagram for explaining a method for providing a seamless network service based on multiple heterogeneous networks according to an embodiment.

FIG. 4 is a signal flow diagram for explaining a method for providing a seamless network service based on multiple heterogeneous networks according to an embodiment.

Referring to FIG. 4, a terminal 20 accesses all heterogeneous networks 31 and 32 that are capable of providing a network service in an area in which the terminal 20 is located at steps S305-1 and S305-2, and performs registration of a service in a multi-network management apparatus 100 over the heterogeneous networks 31 and 32 at step S310-1 and S310-2.

Next, the terminal 20 and the multi-network management apparatus 100 may recognize that a service link between subscribers is established over the multiple networks, and may manage information. Although two heterogeneous networks are illustrated in the drawing, this structure is merely provided for better understanding of the present disclosure, and the present disclosure is not limited thereto. That is, two or more networks may be present.

The multi-network management apparatus 100 selects a primary network and a secondary network in consideration of the real-time states of the multiple heterogeneous networks at step S320.

Here, the primary network and the secondary network may be selected based on at least one of criteria including the service coverage of each of the multiple heterogeneous networks and service provision conformity for service requested by the terminal 20, or a combination thereof.

Thereafter, the multi-network management apparatus 100 sends a primary network notification message to the first network 31 at step S325-1, and may send a secondary network notification message to the second network 32 at step S325-2. Furthermore, such primary network notification and secondary network notification may be transferred to the terminal 20 over respective networks.

Thereafter, the multi-network management apparatus 100 also notifies the server 10 that provision of the service is available through provision of network information and connection to the service at step S330.

As an initial network setup task for providing the network service is completed through the above-described steps, the terminal 20 transfers data such as vehicle sensing information to the server 10 over the first network 31, which is the primary network, and the multi-network management apparatus 100 at step S340.

Further, the multi-network management apparatus 100 recognizes the real-time network state, that is, quality information or the like, of the first network 31, which is the primary network, at step S345 while transferring the real-time state (quality) information of the network to the server 10 at step S350.

Next, the server 10 provides a network-customized service suitable for the real-time state of the first network 31 at step S355. Then, the multi-network management apparatus 100 transmits vehicle service information transferred from the server 10 at step S360 to the terminal 20 over the first network 31 at step S380.

Here, the multi-network management apparatus 100 generates data for synchronization with the service data provided from the server 10 at step S385, and also equally provides the synchronization data to the second network 32, which is the secondary network 32, at step S390. That is, actualization is performed such that data required for the terminal 20 may be seamlessly provided at any time through real-time synchronization with the data transferred to the second network 32 by exchanging information with the first network 31.

Meanwhile, the second network 32 in a standby state may periodically check mutual connectivity with the terminal 20 through a connection check message at step S370. In this case, unless a network connection is checked, access to the network may be re-attempted, or alternatively a search for another secondary network and the registration and management of the service may be performed.

Figure 5:
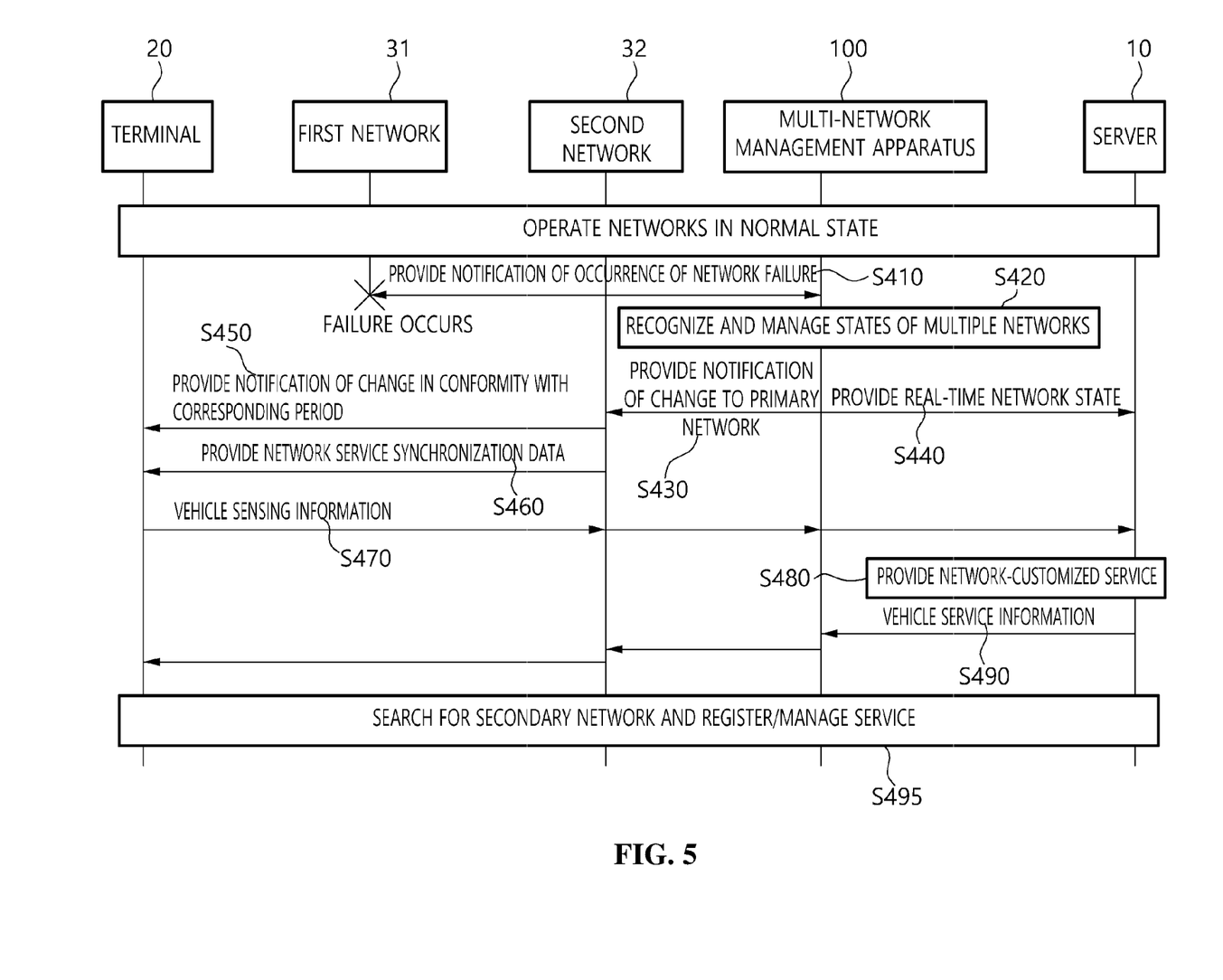
FIG. 5 is a signal flow diagram for explaining the step of changing a secondary network to a primary network according to a first embodiment.

FIG. 5 is a signal flow diagram for explaining the step of changing a secondary network to a primary network according to a first embodiment.

Referring to FIG. 5, in the first embodiment, when a failure occurs in the first network 31 functioning as the primary network and the first network 31 is incapable of providing a network service to the terminal 20, the infrastructure of the first network 31 may sense such incapability and then seamlessly provide the network service.

The first network 31 may provides notification of occurrence of a network failure to the multi-network management apparatus 100 at step S410.

Then, the multi-network management apparatus 100 recognizes the states of multiple networks at step S420, and sends a message indicating a change to the primary network to the second network 32, which is the secondary network, at step S430.

Further, the multi-network management apparatus 100 provides the real-time state information of the second network 32 changed to the primary network to the server 10 at step S440, thus enabling a customized network service to be provided.

The second network 32 being in a standby state sends a message, indicating that the second network 32 has changed to the primary network, to the terminal 20 at step S450. Here, the message may be sent in conformity with a communication connection period between the terminal 20 and the second network 32.

Furthermore, the second network 32 provides service data actualized and stored in real time in a buffer to the terminal 20 at step S460.

Then, the terminal 20 continues to upload sensing information of the vehicle and additional information onto the second network 32 changed to the primary network so as to continue to provide the network service previously provided over the first network 31 at step S470.

Next, the server 10 provides a network customized service corresponding to the real-time state of the second network 32 to the terminal 20 over the second network 32 at steps S480 and S490.

Thereafter, the terminal 20 searches for a new secondary network and gradually manages the secondary network through registration of the service at step S495. That is, the multi-network management apparatus 100 may reselect and register a new secondary network from among two or more heterogeneous networks accessible to the terminal 20 that has requested registration of the service.

Figure 6:
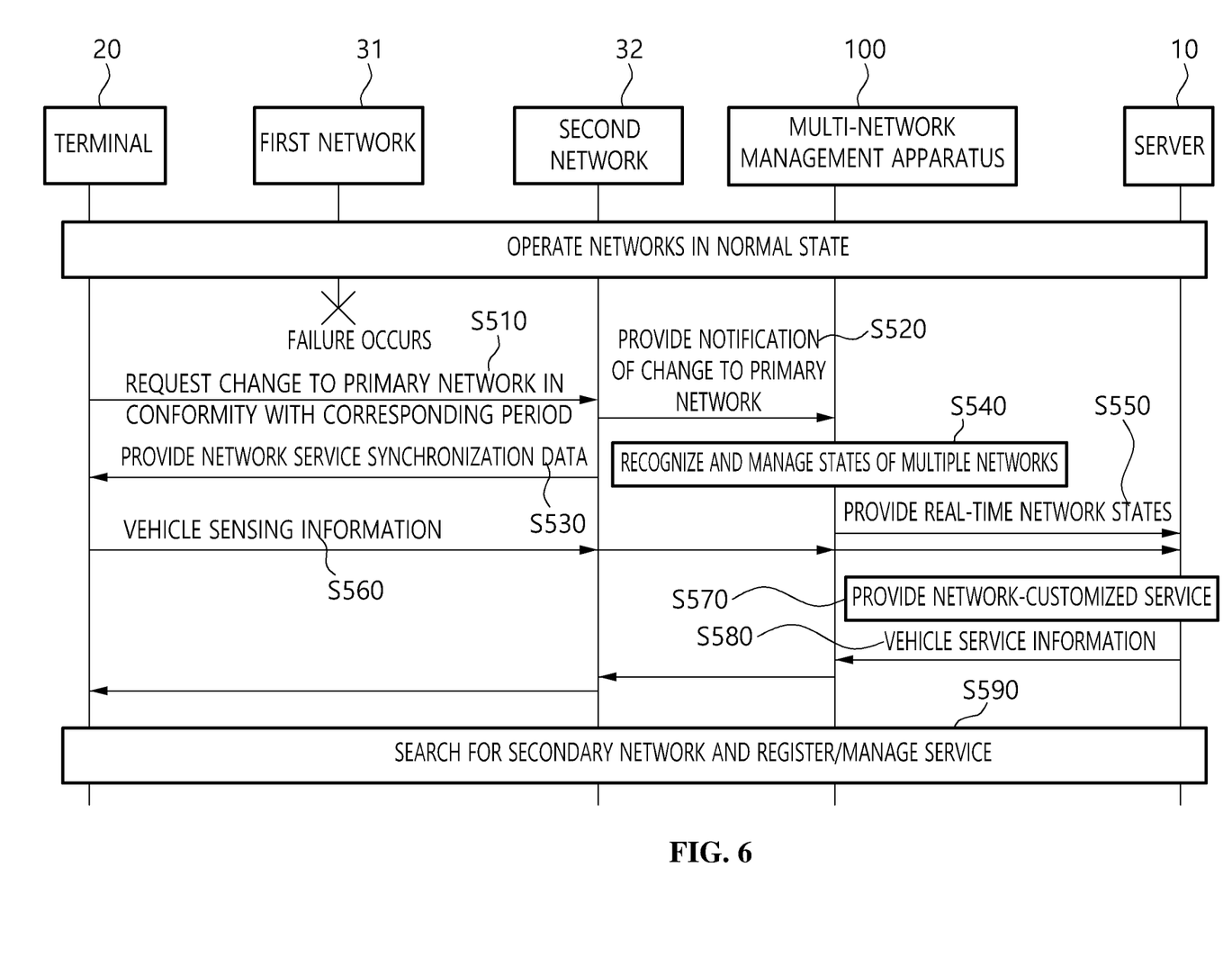
FIG. 6 is a signal flow diagram for explaining the step of changing a secondary network to a primary network according to a second embodiment.

FIG. 6 is a signal flow diagram for explaining the step of changing a secondary network to a primary network according to a second embodiment.

Referring to FIG. 6, in the second embodiment, when a failure occurs in the first network 31 currently functioning as a primary network and the first network 31 is incapable of providing a network service to the terminal 20, it is possible to respond to the failure by changing the network under the supervision of the terminal 20.

When it is determined that a communication failure or etc. occurs in the first network 31 in use and a problem is present in the network service, the terminal 20 requests a change to the primary network from the second network 32, which is a secondary network, in conformity with a communication period at step S510.

The second network 32 notifies the multi-network management apparatus 100 that the second network 32 has changed to the primary network at step S520. Further, the second network 32 provides a seamless network service by providing data stored therein to the terminal 20 through real-time actualization at step S530.

Meanwhile, when the change of the second network 32 to the primary network is transferred, the multi-network management apparatus 100 provides the real-time state information of the second network 32 to the server 10 at step S550.

Thereafter, pieces of data including vehicle sensing information transmitted from the terminal 20 are transferred to the server 10 over the second network 32, which is the primary network, at step S560.

Next, the server 10 provides a network-customized service corresponding to the real-time state information of the second network 32 at step S570, and the network-customized service is provided such that vehicle service information is transferred to the terminal 20 over the second network 32 via the multi-network management apparatus 100 at step S580.

Thereafter, the terminal 20 searches for a new secondary network and gradually manages the secondary network through registration of the corresponding service at step S590. That is, the multi-network management apparatus 100 may reselect and register a new secondary network from among two or more heterogeneous networks accessible to the terminal 20 that has requested registration of the service.

Figure 7:
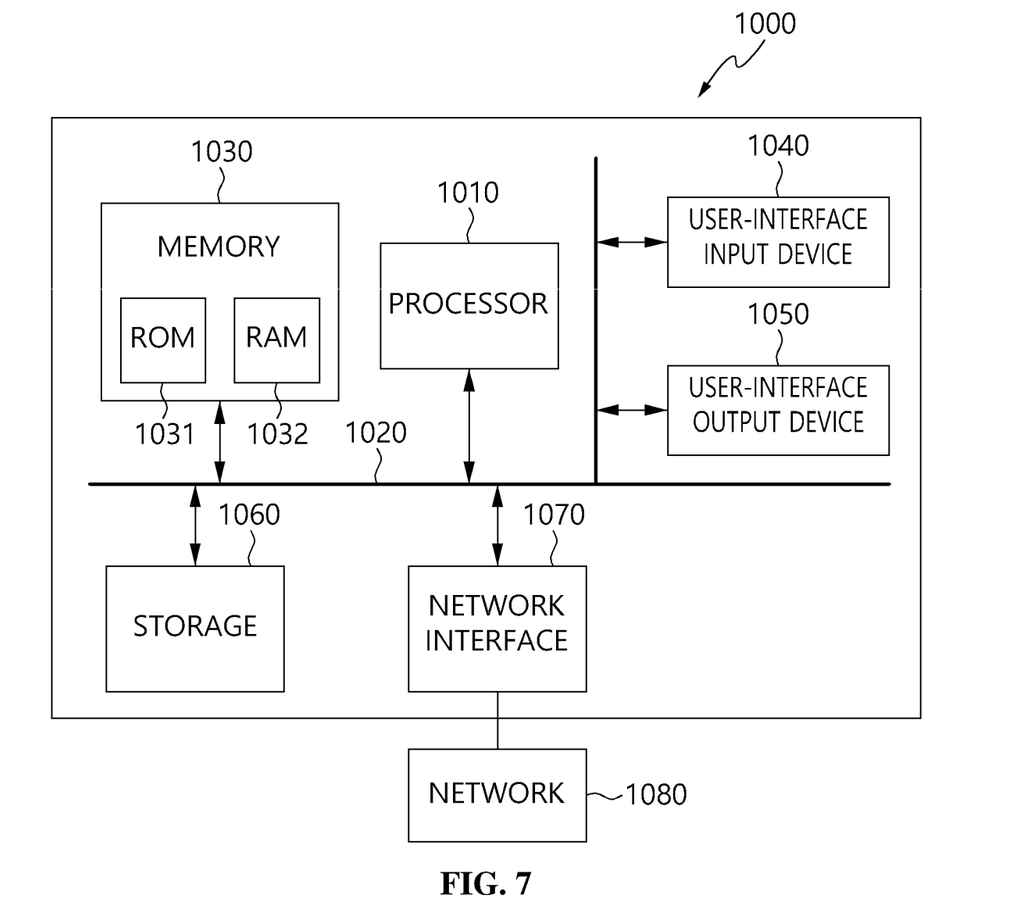
FIG. 7 is a diagram illustrating the configuration of a computer system according to an embodiment.

FIG. 7 is a diagram illustrating the configuration of a computer system according to an embodiment.

A multi-network management apparatus 100, a server 10, and a terminal 20 according to embodiments may be implemented in a computer system 1000, such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, or an information delivery medium, or a combination thereof. For example, the memory 1030 may include Read-Only Memory (ROM) 1031 or Random Access Memory (RAM) 1032.

In accordance with embodiments, there can be provided a seamless and fast network service in real time when a network failure occurs.

In accordance with embodiments, there can be provided a seamless network service using multiple networks when a network failure occurs.

In accordance with embodiments, there can be provided a customized network service corresponding to the real-time quality of a network.

Although the embodiments of the present disclosure have been disclosed with reference to the attached drawing, those skilled in the art will appreciate that the present disclosure can be implemented in other concrete forms, without changing the technical spirit or essential features of the disclosure. Therefore, it should be understood that the foregoing embodiments are merely exemplary, rather than restrictive, in all aspects.

What is claimed is:

1. A method for providing a seamless network service based on multiple heterogeneous networks, the method comprising:
providing, by a multi-network management apparatus, service data transmitted from a server to a terminal over a primary network;
synchronizing, by the multi-network management apparatus, the service data transmitted over the primary network with a secondary network maintained by pre-storing the service data in a buffer of the secondary network in real time while the secondary network is maintained in a standby state, the synchronizing being performed prior to a communication failure between the primary network and the terminal;
changing, by the multi-network management apparatus, the secondary network to the primary network as the communication failure between the primary network and the terminal occurs;
transmitting, by the multi-network management apparatus, service data that has been actualized and stored in real time in the buffer of the secondary network and that was previously delivered through the primary network to the terminal; and
providing, by the multi-network management apparatus, the service data transmitted from the server to the terminal over the changed primary network,
wherein each of providing the service data transmitted from the server to the terminal over the primary network and providing the service data transmitted from the server to the terminal over the changed primary network comprises:
recognizing a real-time state of the primary network and providing information about the real-time state to the server; and
transmitting a customized service, corresponding to the real-time state information of the primary network provided from the server, over the primary network.

2. The method of claim 1, further comprising:
before providing the service data transmitted from the server to the terminal over the primary network,
selecting and registering, by the multi-network management apparatus, the primary network and at least one secondary network from among two or more heterogeneous networks accessible to the terminal based on a requested registration of the service by the terminal.

3. The method of claim 2, wherein the selecting and registering comprises:
notifying each of corresponding networks that the corresponding networks are selected as the primary network and the secondary network; and
providing information about the primary network to the server and notifying the server that provision of the service is available.

4. The method of claim 2, wherein the selecting and registering comprises:
selecting the primary network and the secondary network based on at least one of criteria including a service coverage of each of the networks and service provision conformity for the service, or a combination thereof.

5. The method of claim 1, further comprising:
periodically checking, by the secondary network and the terminal, a connection to the secondary network.

6. The method of claim 1, wherein changing the secondary network to the primary network comprises:
as the multi-network management apparatus receives a notification of occurrence of a network failure from the primary network, notifying the secondary network that the secondary network has changed to the primary network; and
transmitting, by the secondary network having received the notification of the change to the primary network, a notification of the change to the primary network to the terminal while transmitting network service synchronization data of a previous primary network to the terminal.

7. The method of claim 1, wherein changing the secondary network to the primary network comprises:
requesting, by the terminal based on a recognized occurrence of a network failure in the primary network, a change to the primary network from the secondary network; and
transmitting, by the secondary network, a notification of the change of the secondary network to the primary network to the multi-network management apparatus,
wherein the secondary network having received the notification of the change to the primary network transmits network service synchronization data of a previous primary network to the terminal.

8. The method of claim 1, further comprising:
reselecting and registering, by the multi-network management apparatus, a new secondary network from among two or more heterogeneous networks accessible to the terminal based on a requested registration of the service by the terminal.

9. A multi-network management apparatus for providing a seamless network service based on multiple heterogeneous networks, comprising:
a memory configured to store at least one program; and
a processor configured to execute the program,
wherein the program is configured to perform:
providing service data transmitted from a server to a terminal over a primary network;
synchronizing the service data transmitted over the primary network with a secondary network maintained by pre-storing the service data in a buffer of the secondary network in real time while the secondary network is maintained in a standby state, the synchronizing being performed prior to a communication failure between the primary network and the terminal;
changing the secondary network to the primary network as the communication failure between the primary network and the terminal occurs;
transmitting, by the multi-network management apparatus, service data that has been actualized and stored in real time in a buffer of the secondary network and that was previously delivered through the primary network to the terminal; and
providing the service data transmitted from the server to the terminal over the changed primary network,
wherein the program is configured to further perform:
in providing the service data transmitted from the server to the terminal over the primary network,
recognizing a real-time quality state of the primary network and providing information about the real-time quality state to the server; and
transmitting a customized service, corresponding to the real-time quality state information of the primary network, over the primary network,
in the recognizing the real-time quality state of the primary network and providing information about the real-time quality state of the primary network to the server, recognizing a real-time quality state of the changed primary network and providing information about the real-time quality state of the changed primary network to the server; and transmitting a customized service, corresponding to the real-time quality state information of the changed primary network, over the changed primary network.

10. The multi-network management apparatus of claim 9, wherein the program is configured to further perform:

before providing the service data transmitted from the server to the terminal over the primary network, selecting and registering the primary network and at least one secondary network from among two or more heterogeneous networks accessible to the terminal based on a requested registration of the service by the terminal.

11. The multi-network management apparatus of claim 10, wherein the program is configured to further perform:

in the selecting and registering, notifying each of corresponding networks that the corresponding networks are selected as the primary network and the secondary network; and providing information about the primary network to the server and notifying the server that provision of the service is available.

12. The multi-network management apparatus of claim 10, wherein the program is configured to further perform:

in the selecting and registering, selecting the primary network and the secondary network based on at least one of criteria including a service coverage of each of the networks and service provision conformity for the service, or a combination thereof.

13. The multi-network management apparatus of claim 9, wherein the program is configured to further perform:

in providing the service data transmitted from the server to the terminal over the changed primary network, as a notification of occurrence of a network failure is received from the primary network, notifying the secondary network that the secondary network has changed to the primary network.

14. The multi-network management apparatus of claim 9, wherein the program is configured to further perform:

in changing the secondary network to the primary network, as a notification of a change of the secondary network to the primary network is received from the secondary network, recognizing the real-time quality state of the changed primary network and providing information about the real-time quality state to the server; and transmitting a customized service, corresponding to the real-time quality state of the changed primary network provided from the server, over the changed primary network.

15. The multi-network management apparatus of claim 9, wherein the program is configured to further perform:

reselecting and registering a new secondary network from among two or more heterogeneous networks accessible to the terminal based on a requested registration of the service by the terminal.

16. A terminal, comprising:

a memory configured to store at least one program; and a processor configured to execute the program, wherein the program is configured to perform:

accessing two or more heterogeneous networks and requesting registration of a service;

receiving a notification from each of a primary network and a secondary network selected from among the two or more heterogeneous networks; and transmitting/receiving service data to/from a server over the primary network, wherein the program is configured to further perform periodically accessing the secondary network while transmitting/receiving the service data; and in response to receiving a notification of changing the primary network from the secondary network, transmitting and receiving the service data with the server through the changed primary network, wherein, in the transmitting/receiving the service data, the terminal receives data synchronized by a previous primary network from the changed primary network, the synchronized data being stored in a buffer of the secondary network, and receiving a customized service, corresponding to real-time quality state information of the changed primary network provided from the server, over the changed primary network.

17. The terminal of claim 16, wherein the program is configured to further perform:

as a notification of a change to the primary network is received from the secondary network, transmitting/receiving the service data to/from the server over the changed primary network.

18. The terminal of claim 16, wherein the program is configured to further perform:

as occurrence of a failure in the primary network is recognized, requesting a change to the primary network from the secondary network; and transmitting/receiving the service data to/from the server over the changed primary network.

* * * * *